(12) United States Patent
Yang et al.

(10) Patent No.: US 9,933,899 B2
(45) Date of Patent: Apr. 3, 2018

(54) CAPACITIVE TOUCH STRUCTURE, IN-CELL TOUCH PANEL, DISPLAY DEVICE AND SCANNING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 222 days.

(21) Appl. No.: 14/653,438

(22) PCT Filed: Sep. 20, 2014

(86) PCT No.: PCT/CN2014/087006
§ 371 (c)(1),
(2) Date: Jun. 18, 2015

(87) PCT Pub. No.: WO2015/180315
PCT Pub. Date: Dec. 3, 2015

(65) Prior Publication Data
US 2016/0259443 A1    Sep. 8, 2016

(30) Foreign Application Priority Data
May 30, 2014   (CN) .......................... 2014 1 0241053

(51) Int. Cl.
G06F 3/044 (2006.01)
G02F 1/1343 (2006.01)
G06F 3/041 (2006.01)

(52) U.S. Cl.
CPC ............ *G06F 3/044* (2013.01); *G02F 1/1343* (2013.01); *G06F 3/0412* (2013.01); *G06F 2203/04112* (2013.01)

(58) Field of Classification Search
CPC ........... G06F 2203/04112; G06F 3/044; G06F 3/0412; G02F 1/1343
See application file for complete search history.

(56) References Cited

U.S. PATENT DOCUMENTS

| | | | |
|---|---|---|---|
| 8,484,838 B2 | 7/2013 | Badaye et al. | |
| 2009/0267916 A1* | 10/2009 | Hotelling | G06F 3/044 345/174 |

(Continued)

FOREIGN PATENT DOCUMENTS

| | | |
|---|---|---|
| CN | 101923419 A | 12/2010 |
| CN | 102985900 A | 3/2013 |

(Continued)

OTHER PUBLICATIONS

Li et al., Translation of CN 103116431, May 22, 2013.*

(Continued)

*Primary Examiner* — Dmitriy Bolotin
(74) *Attorney, Agent, or Firm* — Collard & Roe, P.C.

(57) ABSTRACT

Disclosed are a capacitive touch structure, an in-cell touch panel, a display device and a scanning method thereof. The capacitive touch structure includes: a plurality of self-capacitance electrodes (10) disposed in a same layer and located in at least two regions contained in the layer surface where self-capacitance electrodes (10) are located; region electrodes (20) located in each of the regions and disposed (Continued)

in the same layer with the self-capacitance electrodes (10); first wires connected with the self-capacitance electrodes (10), wherein there is at least a plurality of first wires (41) that satisfy the following conditions: one of the first wire (41) is connected with at least two of the self-capacitance electrodes (10) located in different regions respectively; second wires connected with the region electrodes (20), wherein the region electrodes in respective regions are electrically connected with different second wires; and a touch sensing chip connected with the first wires (41) and the second wires.

18 Claims, 12 Drawing Sheets

(56) References Cited

U.S. PATENT DOCUMENTS

| | | | | |
|---|---|---|---|---|
| 2009/0314621 | A1* | 12/2009 | Hotelling | G06F 3/0416 |
| | | | | 200/600 |
| 2011/0279401 | A1 | 11/2011 | Hong et al. | |
| 2012/0001867 | A1* | 1/2012 | Kawaguchi | G06F 3/044 |
| | | | | 345/174 |
| 2012/0227259 | A1* | 9/2012 | Badaye | G06F 3/044 |
| | | | | 29/846 |
| 2014/0049121 | A1 | 2/2014 | Liu et al. | |
| 2014/0054156 | A1* | 2/2014 | Chang | H03K 17/9622 |
| | | | | 200/600 |
| 2014/0132534 | A1 | 5/2014 | Kim | |
| 2016/0018922 | A1* | 1/2016 | Wang | G06F 3/0412 |
| | | | | 345/174 |
| 2016/0026291 | A1* | 1/2016 | Zhao | G06F 3/044 |
| | | | | 345/174 |
| 2016/0098113 | A1* | 4/2016 | Ding | G06F 3/044 |
| | | | | 345/174 |
| 2016/0139727 | A1* | 5/2016 | Kim | G06F 3/044 |
| | | | | 345/174 |
| 2016/0216802 | A1* | 7/2016 | Bao | G06F 3/0412 |
| 2016/0246408 | A1* | 8/2016 | Wang | G06F 3/044 |
| 2016/0274715 | A1* | 9/2016 | Wang | G02F 1/13 |
| 2016/0282976 | A1* | 9/2016 | Yang | G06F 3/044 |
| 2016/0370917 | A1* | 12/2016 | Li | G06F 3/044 |
| 2016/0370925 | A1* | 12/2016 | Ding | G06F 3/0412 |
| 2017/0017328 | A1* | 1/2017 | Tsai | G06F 3/0412 |

FOREIGN PATENT DOCUMENTS

| | | |
|---|---|---|
| CN | 103092422 A | 5/2013 |
| CN | 103116431 A | 5/2013 |
| CN | 103235663 A | 8/2013 |
| CN | 203241971 U | 10/2013 |
| CN | 103631432 A | 3/2014 |
| CN | 103793120 A | 5/2014 |
| CN | 104035639 A | 9/2014 |

OTHER PUBLICATIONS

International Search Report of PCT/CN2014/087006 in Chinese, dated Mar. 3, 2015 with English translation.
Notice of Transmittal of the International Search Report of PCT/CN2014/087006 in Chinese, dated Mar. 3, 2015.
Written Opinion of the International Searching Authority of PCT/CN2014/087006 in Chinese, dated Mar. 3, 2015 with English translation.
European Search Report in EP 14868725.4 dated Dec. 4, 2017.

* cited by examiner

CAPACITIVE TOUCH STRUCTURE, IN-CELL TOUCH PANEL, DISPLAY DEVICE AND SCANNING METHOD

CROSS REFERENCE TO RELATED APPLICATIONS

This application is the National Stage of PCT/CN2014/087006 filed on Sep. 20, 2014, which claims priority under 35 U.S.C. § 119 of Chinese Application No. 201410241053.2 filed on May 30, 2014, the disclosure of which is incorporated by reference.

FIELD OF THE INVENTION

Embodiments of the present invention relate to a capacitive touch structure, an in-cell touch panel, and a display device and a scanning method thereof.

BACKGROUND

With the fast development of display technology, touch panel panels have become popular in people's life gradually. At present, touch structures of touch panels can be classified into self-capacitance touch structure and mutual capacitance touch structure. The self-capacitance touch structures, due to high accuracy and signal-to-noise ratio for touch sense, have received good graces from panel manufacturers.

At present, self-capacitance touch structures utilize self-capacitance principle to implement detection of finger touch position as follows. The touch structure has a plurality of self-capacitance electrodes disposed in the same layer and insulated from each other. When the panel is not touched, each self-capacitance electrode experiences a capacitance of fixed value. When the panel is touched, respective self-capacitance electrodes corresponding to the touch position experience a capacitance that is the fixed value plus the body capacitance. The touch sensing chip can determine the touch position by detecting capacitance value variation of respective self-capacitance electrodes in a touch period.

SUMMARY

At least one embodiment of the present invention provides a capacitive touch structure comprising: a plurality of self-capacitance electrodes arranged in a matrix in a same layer and insulated from each other, located in at least two regions contained in a layer surface where the self-capacitance electrodes are located; region electrodes in each of the regions, disposed in the same layer with the self-capacitance electrodes and insulated from the self-capacitance electrodes; a plurality of first wires electrically connected with the self-capacitance electrodes but not crossing each other, wherein there are at least a plurality of the first wires that satisfy the following conditions: one of the first wires is electrically connected with at least two of the self-capacitance electrodes, and the at least two self-capacitance electrodes are located in different regions respectively; a plurality of second wires electrically connected with the region electrodes but not crossing each other, wherein the region electrodes in respective regions are electrically connected with different second wires; and a touch sensing chip electrically connected with the first wires and the second wires and configured to determine a touch position.

At least one embodiment of the present invention provides an in-cell touch panel comprising a top substrate and a bottom substrate oppositely disposed and the capacitive touch structure of the embodiment of the present invention; and the self-capacitance electrodes, the region electrodes, the first wires and the second wires are disposed on a side of the top substrate facing the bottom substrate or on a side of the bottom substrate facing the top substrate.

At least one embodiment of the present invention provides a display device including: the in-cell touch panel of the embodiments of the present invention.

At least one embodiment of the present invention provides a display device including an add-on mode touch panel including: the capacitive touch structure of the embodiments of the present invention.

At least one embodiment of the present invention provides a scanning method for the display device of the embodiments of the present invention, comprising: conducting a touch scanning and a display scanning in a time-division manner in one frame period.

During the touch scanning, the touch sensing chip applies driving signals to the region electrodes in a time-division manner through second wires and periphery traces connected with the region electrodes; and during applying driving signals to each region electrode, the touch sensing chip applies driving signals to the self-capacitance electrodes in a time-division manner through the first wires and the periphery traces connected with the self-capacitance electrodes; and the touch sensing chip receives feedback signals of the self-capacitance electrodes and the region electrodes, determines a region where a touch position locates according to the feedback signals of the region electrodes, and determines the touch position according to the feedback signals of the self-capacitance electrodes.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1A:
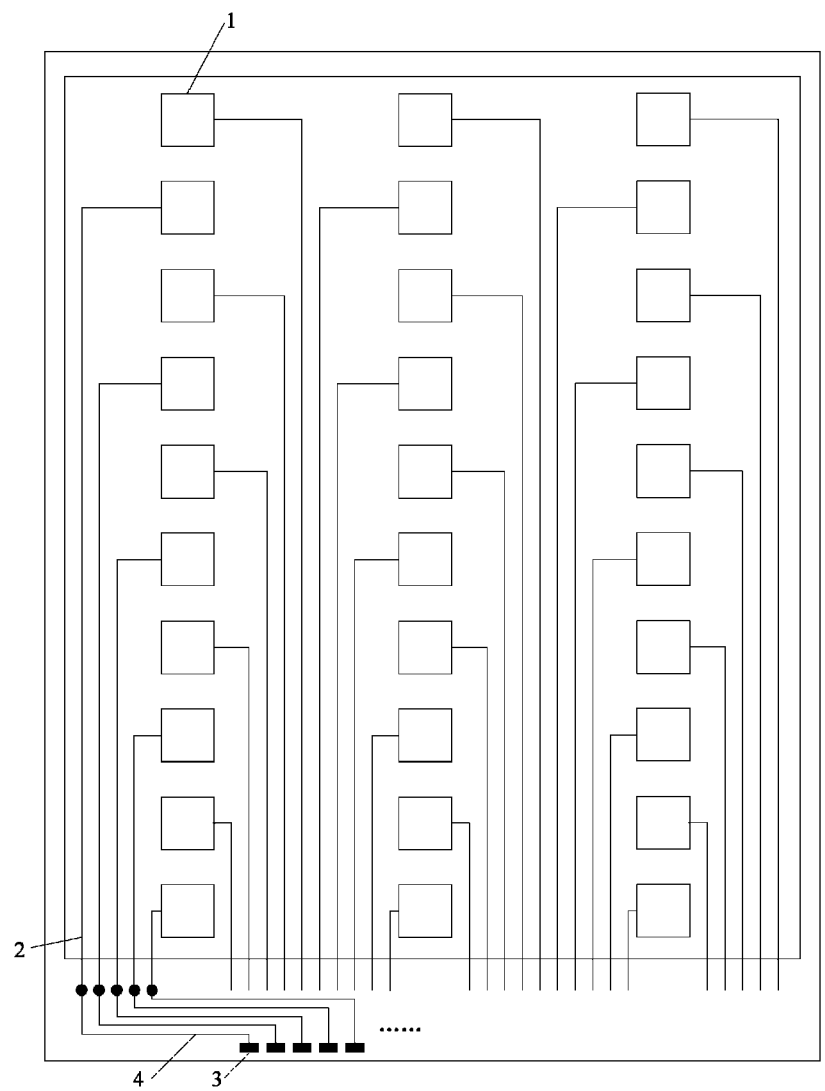
FIG. 1a is a schematic structural top view showing a capacitive touch structure in which wires and self-capacitance electrodes are disposed in the same layer.
Figure 1B:
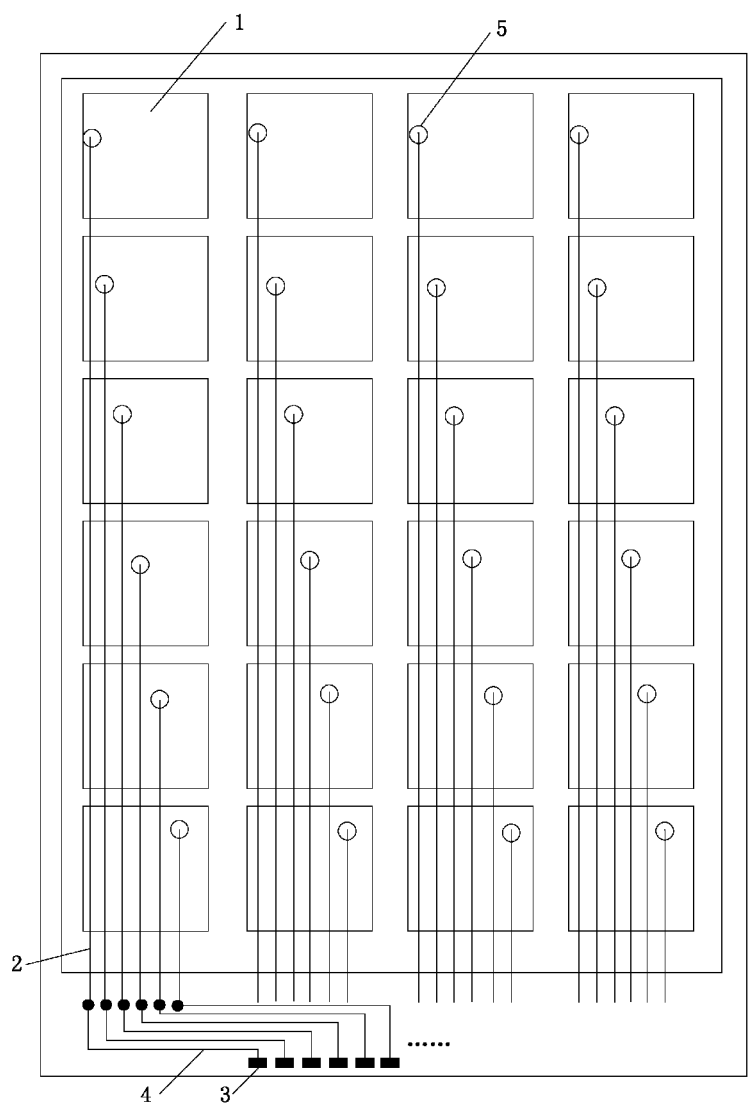
FIG. 1b is a schematic structural top view showing a capacitive touch structure in which wires and self-capacitance electrodes are disposed in different layers.

FIG. 1a is a schematic structural top view showing a capacitive touch structure in which wires and self-capacitance electrodes are disposed in the same layer, and FIG. 1b is a schematic structural top view showing a capacitive touch structure in which wires and self-capacitance electrodes are disposed in different layers. In a self-capacitance touch structure, each self-capacitance electrode needs to be connected with the touch sensing chip via a separate lead-out wire. As shown in FIGS. 1a and 1b, each lead-out wire can include, for example: a wire 2 connecting with the self-capacitance electrode 1 and extending to a border of the touch panel, and a periphery trace 4 disposed at the border and connecting the self-capacitance electrode 1 to a connecting terminal 3 of the touch sensing chip. In FIG. 1a, the wires 2 and the self-capacitance electrodes 1 are disposed in a same layer; while in FIG. 1b, the self-capacitance electrodes 1 and the wires 2 are disposed in different layers, and the self-capacitance electrodes 1 and the corresponding wires 2 are electrically connected through via holes 5.

In the above-mentioned structure, the number of the self-capacitance electrodes is quite large. Taking the self-capacitance electrodes each occupying an area of 5 mm*5 mm as an example, a 5 inch liquid crystal display panel needs 264 self-capacitance electrodes. If each of the self-capacitance electrodes is designed smaller, there will be more self-capacitance electrodes, which results in more wires connecting with the self-capacitance electrodes. Therefore, the large number of wires will result in a large number of periphery traces one-to-one connected with the wires at a border, which is adverse to narrow border design. And when the wires and the self-capacitance electrodes are disposed in the same layer, a large number of wires may lead to a large touch dead zone.

At least one embodiment of the present invention provides a capacitive touch structure including a plurality of self-capacitance electrodes arranged in matrix in the same layer and insulated from each other which are respectively disposed in at least two regions of the layer surface where they are located; region electrodes in each of the regions, disposed in the same layer with the self-capacitance electrodes and insulated from the self-capacitance electrodes, wherein when the capacitive touch structures are subjected to touch operation and the touch position is anywhere in one of the regions, the capacitance value of the one of the region electrode in the region will change; and a plurality of first wires electrically connected with the self-capacitance electrodes without crossing each other, wherein there are at least a plurality of the first wires that satisfy the following conditions: one of the first wires is electrically connected with at least two of the self-capacitance electrodes, and the at least two of the self-capacitance electrodes are located in different regions respectively; a plurality of second wires electrically connected with the region electrodes without crossing each other, wherein the second wires electrically connected with the region electrodes in respective regions are different; and a touch sensing chip electrically connected with the first wires and second wires and configured to determine a touch position by detecting capacitance value change of the self-capacitance electrodes and the region electrodes.

In the capacitive touch structure provided by at least one embodiment of the present invention, the lay surface where self-capacitance electrodes are located is divided into at least two regions, and the self-capacitance electrodes are located in the at least two regions respectively, and there are at least a plurality of first wires that satisfy the following conditions: one of the first wires is electrically connected with at least two of the self-capacitance electrodes located in different regions respectively, such that the number of wires connected with self-capacitance electrodes is significantly reduced while the number of self-capacitance electrodes is not changed. The region electrodes are newly added in each of the divided regions and the region electrodes in respective regions are electrically connected with different second wires. Compared to the number of the self-capacitance electrodes, the number of the divided regions is very small, so that the number of added wires connected with the region electrodes is also very small. Therefore, in summary, the number of wires in the present invention is reduced such that issues such as unfavorable factors of narrow border design and large touch dead zone can be solved to a certain extent.

And when the wire connected with the touched self-capacitance electrode is only electrically connected with the self-capacitance electrode, the touch sensing chip can determine that a touch occurs at the position of the self-capacitance electrode according to the signal change on the first wire. When the first wire connected with the touched self-capacitance electrode is electrically connected with at least two of the self-capacitance electrodes, since the at least two of the self-capacitance electrodes are located in different regions respectively and each of the regions are provided with a region electrode, and the region electrodes in respective regions are connected with different second wires, the touch sensing chip determines in which of the regions the touch occurs according to signal change on the second wire electrically connected with the region electrode and further determines at which specific position the touch occurs in combination with signal change on the first wire electrically connected with the self-capacitance electrode, thereby avoid misjudgement and realizing accurate touch sensing.

Embodiments of the present invention will be further described in detail below with reference to accompanying drawings of the specification. Thicknesses and shapes of layers in the accompanying drawings do not reflect real scale, and only serve to illustrate contents of the present invention.

At least one embodiment of the present invention provides a capacitive touch structure applied to a touch panel, including:

a plurality of self-capacitance electrodes disposed in a matrix in the same layer and insulated from each other, which are located in at least two regions contained in the layer surface where the self-capacitance electrodes are located respectively;

region electrodes in each of the regions which are disposed in the same layer as the self-capacitance electrodes and insulated from the self-capacitance electrodes, wherein when a touch operation is conducted on the capacitive touch structure and the touch position is any position in a region, capacitance value of the region electrode in the region would change;

a plurality of first wires electrically connected with the self-capacitance electrodes but not crossing each other, wherein there are at least a plurality of the first wires that satisfy the following conditions: one of the first wires are electrically connected with at least two of self-capacitance electrodes, and the at least two self-capacitance electrodes are located in different regions respectively;

a plurality of second wires electrically connected with the region electrodes but not crossing each other, wherein the second wires electrically connected with the region electrodes in regions are different;

a touch sensing chip electrically connected with the first wires and second wires and configured to determine touch position by detecting capacitance value changes of the self-capacitance electrodes and region electrodes.

In at least one embodiment of the present invention, the surface of layer where self-capacitance electrodes are located is divided into at least two regions in which self-capacitance electrodes are located respectively, and there are at least a plurality of first wires that satisfy the following conditions: one of the first wires is electrically connected with at least two self-capacitance electrodes located in different regions respectively, such that the number of wires connected with self-capacitance electrodes is significantly reduced while the number of self-capacitance electrodes is not changed. Region electrodes are newly added in each of the divided regions and the region electrodes in the regions are electrically connected with different second wires. Since as compared to the number of self-capacitance electrodes, there are very few the divided regions, the number of added wires connected with region electrodes is also very small. Therefore, in summary, the number of wires in the present invention is reduced such that it is possible to reduce the probability of encountering problems that are adverse to narrow border design and of large touch dead zone to a certain extent and it facilitates reducing costs of the touch sensing chip.

And when the wire connected with the touched self-capacitance electrode is only electrically connected with the self-capacitance electrode, the touch sensing chip can determine that a touch occurs at the position of the self-capacitance electrode according to the signal change on the first wire. When the first wire connected with the touched self-capacitance electrode is electrically connected with at least two self-capacitance electrodes, since the at least two self-capacitance electrodes are located in different regions respectively and each of the regions are provided with region electrodes, and the region electrodes in regions are connected with different second wires, the touch sensing chip determines in which of the regions the touch occurs according to signal change on the second wire electrically connected with the region electrode and further determines at which specific position the touch occurs in combination with signal change on the first wire electrically connected with the self-capacitance electrode, thereby avoid misjudgement and realizing accurate touch sensing.

Hereinbelow, embodiments of the self-capacitance electrodes, the region electrodes, the first wire and the second wire in embodiments of the present invention will be briefly described.

1. Self-Capacitance Electrode

In at least one embodiment of the present invention, the self-capacitance electrodes may be of regular shape or irregular shape.

Figure 2:
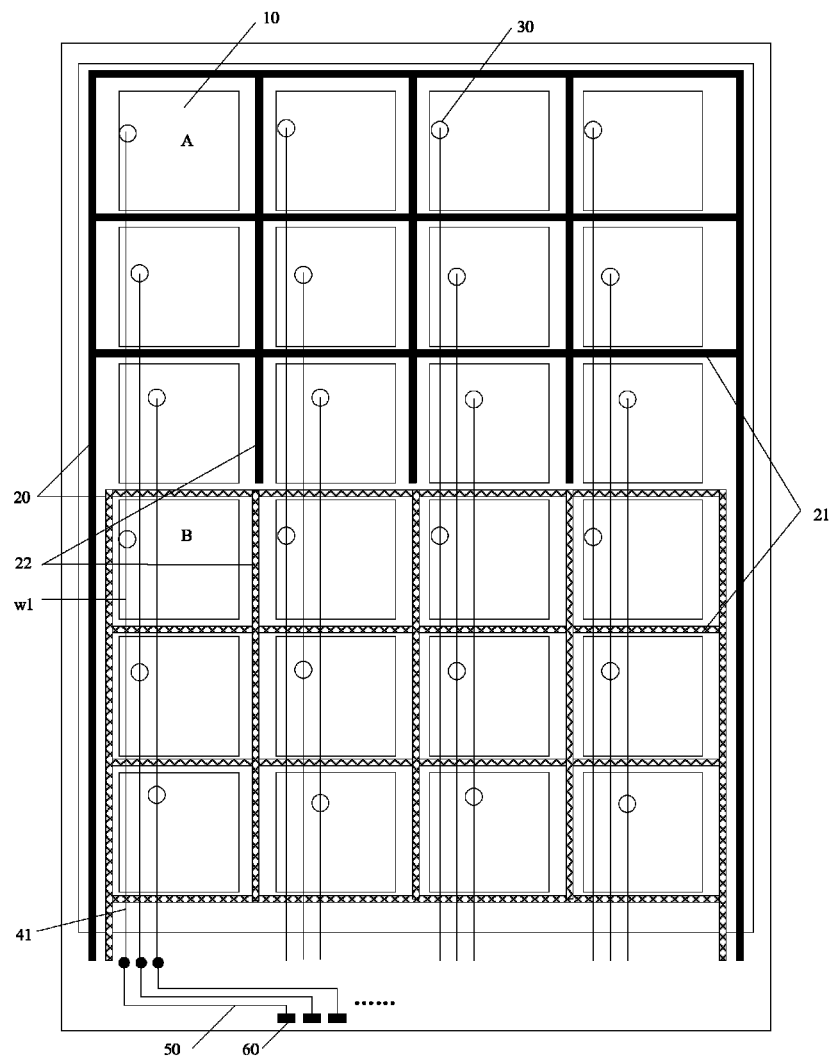
FIG. 2 is a schematic structural top view showing a capacitive touch structure provided in an embodiment of the present invention.

For example, the shape of self-capacitance electrodes may be any regular shape such as square, rectangle, triangle and circle. As shown in FIG. 2, the self-capacitance electrode 10 is of square shape.

Figure 3:
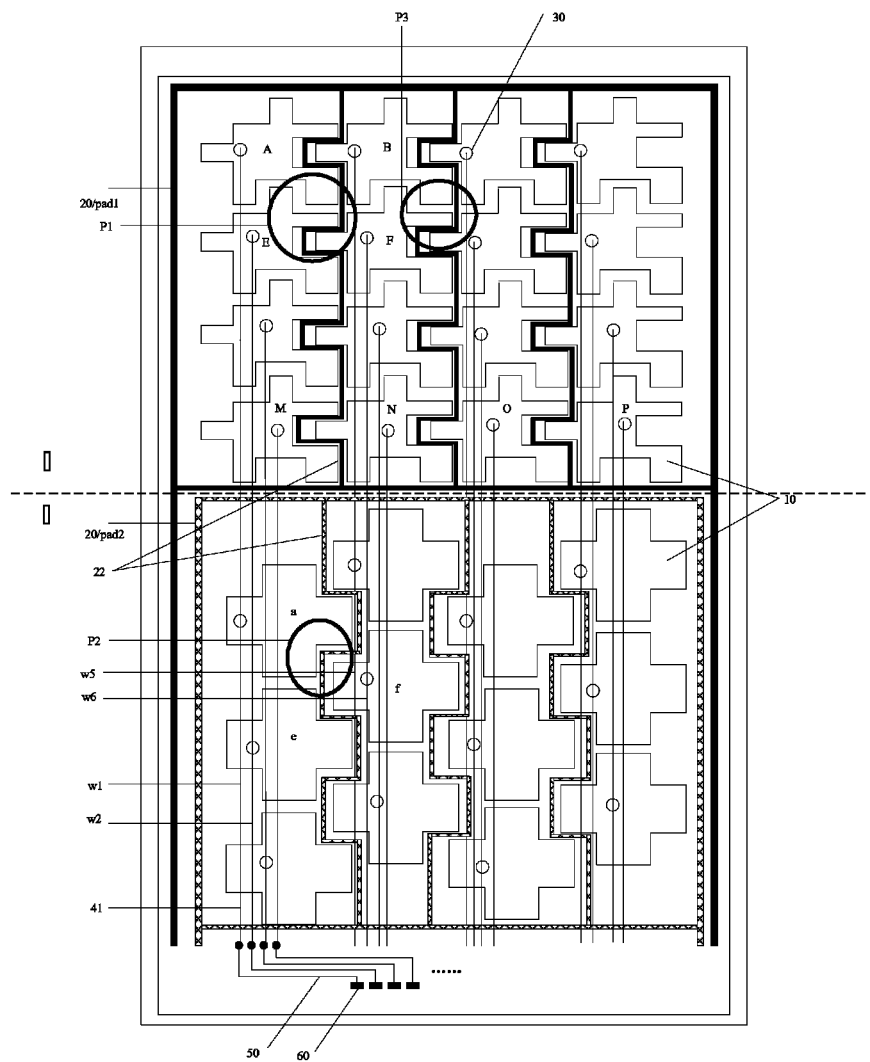
FIG. 3 is a schematic structural top view showing a capacitive touch structure provided in another embodiment of the present invention.

For example, the shape of self-capacitance electrodes may be any irregular shape. As shown in FIG. 3, the layer surface where the self-capacitance electrodes 10 are located contains two regions, i.e., top and lower regions divided along a horizontal direction, the self-capacitance electrodes 10 are located in the top and lower regions respectively, and the self-capacitance electrodes 10 in the upper region have irregular shapes. When the self-capacitance electrodes are of regular shape, their manufacturing complexity is relatively low.

For example, shapes of the respective self-capacitance electrodes may be completely identical. As shown in FIG. 2, each of self-capacitance electrodes 10 included in the capacitive touch structure has the same shape.

For example, shapes of the respective self-capacitance electrodes may be partially identical. As shown in FIG. 3, each of the self-capacitance electrodes 10 in the upper region has identical shape, each of the self-capacitance electrodes 10 in the lower region has identical shape, while the self-capacitance electrodes 10 in the upper region have different shape from that of the self-capacitance electrodes 10 in the lower region.

For example, the respective self-capacitance electrodes may have completely different shapes, that is, any two self-capacitance electrodes have different shapes. When the self-capacitance electrodes have completely identical shape, their manufacturing complexity is relatively low.

In at least one embodiment of the present invention, the opposite sides of two adjacent self-capacitance electrodes are both fold lines.

In at least one embodiment of the present invention, the opposite sides of two adjacent self-capacitance electrodes are fold lines having step-like structures which are consistent in shape and match each other; and/or the facing sides of two adjacent self-capacitance electrodes are fold lines having concave-convex structures that are consistent in shape and match each other.

As shown in FIG. 3, in the lower region, the opposite sides of any two adjacent self-capacitance electrodes 10 are fold lines having step-like structures which are consistent in shape and match each other; in the upper region, the opposite sides of any two adjacent self-capacitance electrodes 10 are fold lines having concave-convex structures which are consistent in shape and match each other.

The opposite sides of two adjacent self-capacitance electrodes is configured as fold lines, so that even when the panel is touched by a little finger of a human body, the touch position can always cover a region where a plurality of self-capacitance electrodes locate, thereby improving accuracy of a determined touch position.

2. Region Electrode

Region electrode has similar operation principle with the self-capacitance electrode. When the panel is not touched by a human body, region electrodes in respective regions withstand a capacitance of fixed value. When the panel is touched by a human body, region electrodes in the region corresponding to the touch position withstand a capacitance that is the fixed value plus the body capacitance. The touch sensing chip can determine the region of touch position by detecting capacitance value variation of region electrodes in the regions during touch scanning.

In at least one embodiment of the present invention, the structure of the region electrode satisfies the following conditions: when a touch operation is conducted on the capacitive touch structure and the touch position is any position in a region, capacitance value of the region electrode in the region changes.

In at least one embodiment of the present invention, the region electrode in respective regions includes a plurality of branches in gap regions between two adjacent rows and/or columns of the self-capacitance electrodes.

Preferably, the region electrode in respective regions includes a plurality of branches in gap regions between any two adjacent rows and columns of self-capacitance electrodes.

As shown in FIG. 2, the region electrode 20 includes a plurality of branches 21 in the gap regions between any two adjacent rows of self-capacitance electrodes 10 respectively, and a plurality of branches 22 in the gap regions between any two adjacent columns of self-capacitance electrodes 10 respectively.

Preferably, the region electrode in respective regions includes a plurality of branches in the gap regions between any two adjacent columns of self-capacitance electrodes.

As shown in FIG. 3, the region electrode 20 includes a plurality of branches 22 in the gap regions between any two adjacent columns of self-capacitance electrodes 10 respectively.

Preferably, a region electrode in each of the regions includes a plurality of branches in a gap region between any two adjacent rows of self-capacitance electrodes.

The embodiment in which the region electrode includes a plurality of branches in the gap regions between adjacent rows of self-capacitance electrodes is similar to the embodiment in which the region electrode includes a plurality of branches in the gap regions between adjacent columns of self-capacitance electrodes as shown in FIG. 3, which will not be described any more herein.

In the case that the region electrode includes a plurality of branches in the gap regions between any two adjacent rows and/or columns of self-capacitance electrodes, it is possible to guarantee that the region electrode is touched when the panel is touched, thereby facilitating ensuring accuracy of a determined touch position.

3. First Wires

In at least one embodiment of the present invention, the first wires and the self-capacitance electrodes can be disposed in the same layer or in different layers, as required.

For example, the first wires and the self-capacitance electrodes are disposed in different layers, and self-capacitance electrodes are electrically connected with the corresponding first wires disposed in a different layer through via holes.

As shown in FIGS. 2 and 3, the self-capacitance electrodes 10 are electrically connected with the corresponding first wires 41 disposed in different layer through via holes 30.

Disposing self-capacitance electrodes and first wires in different layers can reduce touch dead zone in the touch panel.

For example, one self-capacitance electrode can be electrically connected with at least one first wire.

For example, one self-capacitance electrode is electrically connected with one first wire. One self-capacitance electrode being electrically connected one first wire can further reduce the number of first wires.

4. Second Wire

In at least one embodiment of the present invention, the second wires and the region electrodes can be disposed in the same layer or in different layers, as required.

For example, the second wires and the region electrodes are disposed in different layers, and the region electrodes and the corresponding second wires disposed in different layers are electrically connected through via holes.

Disposing region electrodes and second wires in different layers can reduce touch dead zone in the touch panel.

For example, the region electrode in one region is electrically connected with at least one second wire.

For example, the region electrode in one region is electrically connected with one second wire. The region electrode in one region being electrically connected with one second wire can further reduce the number of wires.

Disposing the self-capacitance electrodes and region electrodes in the same layer, disposing the self-capacitance electrodes and first wires in different layer, and disposing the region electrodes and second wires in different layers, can thoroughly eliminate touch dead zone in touch panel.

For example, the first wires and the second wires can be disposed in the same layer or in different layers.

For example, the first wires and second wires are disposed in the same layer but not crossing each other.

Disposing the first wires and second wires in the same layer can save the number of layers.

The first wires and second wires are disposed to not cross each other so as to avoid short circuit between the self-capacitance electrodes and region electrodes.

In at least one embodiment of the present invention, the first wires and the second wires can be electrically connected with the touch sensing chip directly or via periphery traces.

In at least one embodiment of the present invention, the first wires connecting with the self-capacitance electrodes extend to a border of the touch panel; and the second wires connecting with the region electrodes extend to the border of the touch panel.

The touch panel may further include periphery traces at the border of the touch panel which are electrically connected with the first wires and the second wires.

The touch sensing chip is electrically connected with the periphery traces via connection terminals.

For the above-mentioned structure, due to the reduced number of wires, the number of periphery traces connected with wires is also reduced, thus facilitating narrow border design of the touch panel.

Hereinbelow, implementation modes of the embodiments of the present invention will be described briefly, in which the self-capacitance electrodes are located in at least two regions contained in the layer surface where self-capacitance electrodes are located and there are at least a plurality of first wires electrically connected with at least two self-capacitance electrodes in different regions respectively.

It should be noted that any implementation mode for dividing the layer surface where the self-capacitance electrodes are located into at least two regions is applicable to the embodiments of the present invention, that is, the layer surface where the self-capacitance electrodes are located can be divided into at least two regions in equipartition or un-equipartition manner along any direction.

For example, the layer surface where the self-capacitance electrodes are located is divided into at least two regions along horizontal and/or vertical direction. Alternatively, the layer surface where the self-capacitance electrodes are located is divided into at least two regions along a direction forming a 45 degree angle with the horizontal direction. Alternatively, the layer surface where the self-capacitance electrodes are located is divided into at least two regions along a direction forming a 135 degree angle with the horizontal direction.

It should to be noted that any implementation mode in which one first wire electrically connected with at least two self-capacitance electrodes respectively in different regions and first wires are ensured do not to cross each other is applicable to the embodiments of the present invention.

In at least one embodiment of the present invention, the layer surface where the self-capacitance electrodes are located contains at least two regions divided along a horizontal direction, the self-capacitance electrodes are respectively located in the at least two regions, and at least two self-capacitance electrodes electrically connected with the same one first wire are located in the same column.

For example, the first wires extend in the same direction and are parallel to each other so that non-crossing of the first wires is easily realized.

For example, the self-capacitance electrodes are respectively located in at least two regions which are comprised in the layer surface where the self-capacitance electrodes are located and divided along a horizontal direction, and the self-capacitance electrodes have their respective row numbers and column numbers with regard to the respective region they belong to. One of the first wires is electrically connected with the plurality of the self-capacitance electrodes having the same row number and the same column number with regard to the respective regions they belong to.

As shown in FIG. 2, in the layer surface where the self-capacitance electrodes 10 are located, the self-capacitance electrodes 10 are located in the top and lower regions divided along the horizontal direction. The self-capacitance electrodes 10 in the upper region have their respective row numbers and column numbers with regard to the upper region. For example, the self-capacitance electrode A belongs to the first row and first column in the upper region. And, the self-capacitance electrodes 10 in the lower region have their respective row numbers and column numbers with regard to the lower region. For example, the self-capacitance electrode B belongs to the first row and first column in the lower region.

One of the first wires 41 is electrically connected with two self-capacitance electrodes 10 that have the same row number and the same column number in the top and lower regions respectively. For example, the self-capacitance electrode A belongs to the first row and first column in the upper region, the self-capacitance electrode B belongs to the first row and first column in the lower region, which means that the self-capacitance electrode A and the self-capacitance electrode B have the same row number and the same column number with regard to the respective regions they belong to. The wire w1 is adopted to electrically connect with both the self-capacitance electrode A and the self-capacitance electrode B.

The self-capacitance electrodes electrically connected with the one of the first wires have the same row number and the same column number with regard to the respective regions they belong to. Therefore, following this rule, when signals of the first wires change, it is possible to easily determine at which specific position the touch occurs, that is, it is possible to simplify the complexity of determining touch position by the touch sensing chip.

In at least one embodiment of the present invention, the self-capacitance electrodes are respectively located in at least two regions which are comprised in the layer surface where the self-capacitance electrodes are located and divided along a horizontal direction, and at least two self-capacitance electrodes electrically connected with the one of the first wires are located in the same column.

The touch panel has a rectangle border, and the extension directions of the first wires and second wires are consistent with a direction of short side of the border.

The above-mentioned structure can ensure that the first wires and the second wires extend in the same direction and are parallel to each other so that it is easy to realize that each of the first wires do not intersect each other, each of the second wires do not intersect each other, and each of the first and second wires do not intersect each other.

In at least one embodiment of the present invention, the self-capacitance electrodes are respectively located in at least two regions which are comprised in the layer surface where the self-capacitance electrodes are located and divided along a vertical direction, and at least two self-capacitance electrodes electrically connected with the one of the first wires are located in the same row.

The above-mentioned structure can ensure that the first wires extend in the same direction and are parallel to each other so that non-crossing of the first wires is easily realized.

For example, the self-capacitance electrodes are respectively located in at least two regions which are comprised in the layer surface where the self-capacitance electrodes are located and divided along a vertical direction, and the self-capacitance electrodes have their respective row numbers and column numbers with regard to the respective regions they belong to. One of the first wires is electrically connected with the plurality of the self-capacitance electrodes having the same row number and the same column number with regard to the respective regions they belong to.

The plurality of self-capacitance electrodes electrically connected with the one the first wire have the same row number and the same column number with regard to the respective regions they belong to. Therefore, following this rule, Therefore, following this rule, when signals of the first wires change, it is possible to easily determine at which specific position the touch occurs, that is, it is possible to simplify the complexity of determining touch position by the touch sensing chip.

For example, the self-capacitance electrodes are respectively located in at least two regions which are comprised in the layer surface where the self-capacitance electrodes are located and divided along a vertical direction, and at least two self-capacitance electrodes electrically connected with the one of the first wires are located in the same row. The touch panel has a rectangle border, and the extension directions of the first wires and second wires are consistent with a direction of long side of the border.

Thus, it is ensured that the first wires and the second wires extend in the same direction and are parallel to each other so that it is easy to realize that each of the first wires do not intersect each other, each of the second wires do not intersect each other, and each of the first and second wires do not intersect each other.

Implementation modes of the capacitive touch structure in embodiments of the present invention will be described in detail below with reference to FIG. 3.

As shown in FIG. 3, the capacitive touch structure applied to the touch panel is as follows. A plurality of self-capacitance electrodes 10 disposed in an array matrix and in the same layer are insulated from each other, they are located in an upper region and a lower region divided along the horizontal direction in the layer surface where the self-capacitance electrodes 10 are located. As shown in FIG. 3, there are 4 rows and 4 columns of the self-capacitance electrodes 10 (a total of 16 self-capacitance electrodes 10) in the upper region, and there are 3 rows and 4 columns of self-capacitance electrodes 10 (a total of 12 self-capacitance electrodes 10) in the lower region.

There is one region electrode 20 in each of the regions. The region electrode 20 in the upper region is disposed in the same layer as the self-capacitance electrodes 10 and insulated from the self-capacitance electrodes 10. The region electrode 20 includes a plurality of branches 22 in the gap region between adjacent columns of the self-capacitance electrodes. The implementation mode for the region electrode 20 in the lower region is similar to that of the region electrode 20 in the upper region.

A plurality of first wires 41 are parallel to each other and disposed in a layer different from the self-capacitance electrodes 10. The first wires 41 connect with the self-capacitance electrodes 10 and extend to the border of the touch panel. One of first wire 41 is electrically connected with two self-capacitance electrodes 10 that have the same row number and the same column number with regard to the upper and lower regions they respectively belong to. For example, the first wire w1 is electrically connected with the self-capacitance electrode A and the self-capacitance electrode a, the first wire w2 is electrically connected with the self-capacitance electrode E and the self-capacitance electrode e, and so on. In addition, for the self-capacitance electrode M, the self-capacitance electrode N, the self-capacitance electrode O and the self-capacitance electrode P in the upper region, since in the lower region there is no self-capacitance electrode having the same row number and the same column number as theirs, each of them is electrically connected with one first wire 41 respectively.

Two second wires in different layer from the region electrodes 20 are provided to not cross each other (not shown). They connect the region electrodes 20 respectively and extend to the border of the touch panel. The region electrode pad1 in the upper region is electrically connected with one second wire, and the region electrode pad2 in the lower region is electrically connected with the other second wire.

Periphery traces 50 are provided at the border of the touch panel and connected with the first wires 41 and second wires in one-to-one correspondence.

A touch sensing chip is electrically connected with periphery traces 50 via connection terminals 60 and configured to determine touch position by detecting capacitance value changes of self-capacitance electrodes 10 and region electrodes 20 in touch scanning period.

In implementation, 16 self-capacitance electrodes 10 in upper region and 12 self-capacitance electrodes 10 in lower region as shown in FIG. 3 will be described below as an example.

In the case of applying a solution in which one wire is electrically connected with one self-capacitance electrode, a total of 28 wires are required.

In the case of applying the solution described in the above-mentioned embodiments, 12 first wires 41 are needed to electrically connect with two self-capacitance electrodes 10 having the same row number and the same column number with regard to the top and lower regions they belong to; 4 first wires 41 are needed to electrically connect with the self-capacitance electrode M, the self-capacitance electrode N, the self-capacitance electrode O and the self-capacitance electrode P in the upper region respectively; and 2 second wires are needed to electrically connected with the region electrodes in the top and lower regions respectively are required. Therefore, a total of 18 wires are required.

Therefore, in summary, the number of wires needed in the present invention is reduced, which reduces the number of periphery traces connected with these wires in one-to-one correspondence. This is advantageous for narrow border design of touch panel and reducing costs of touch sensing chips.

The touch principle of the capacitive touch structure applied in the touch panel in the embodiments of the present invention will be described in detail below with reference to FIG. 3.

I. Single-Point Touch

1. Touch Point in Upper Region Shown in FIG. 3

Figure 4:
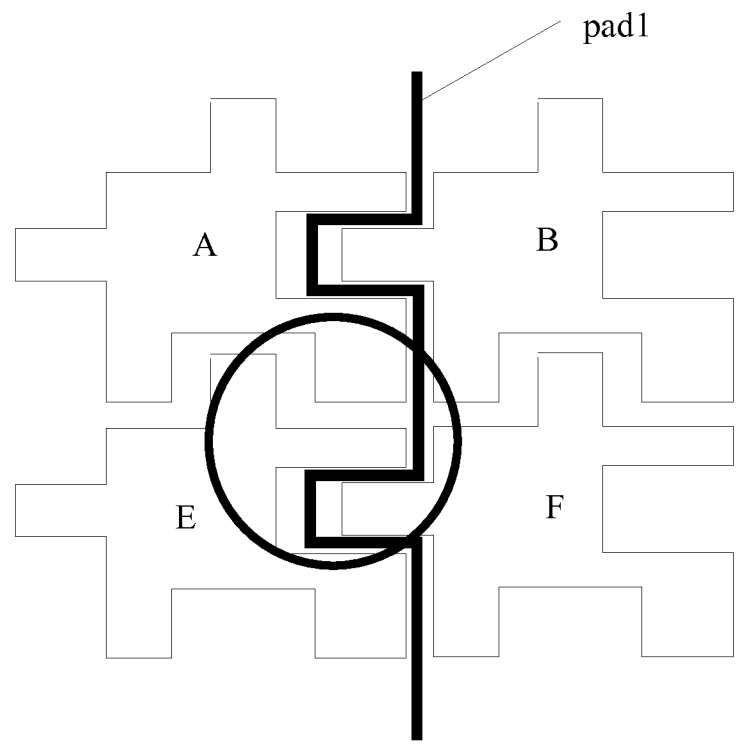
FIG. 4 is a partial enlargement view showing point P1 in FIG. 3 in the embodiment of the present invention.

As shown in FIG. 4, a point P1 in the upper region shown in FIG. 3 partially overlaps with the region electrode pad1, the self-capacitance electrode A, the self-capacitance electrode B, the self-capacitance electrode E and the self-capacitance electrode F in the upper region. The point P1 has an overlapping region area of S1 with the self-capacitance electrode A, an overlapping region area of S4 with the self-capacitance electrode B, an overlapping region area of S2 with the self-capacitance electrode E, and an overlapping region area of S3 with the self-capacitance electrode F, wherein s2>S1>S3>S4.

Figure 5A:
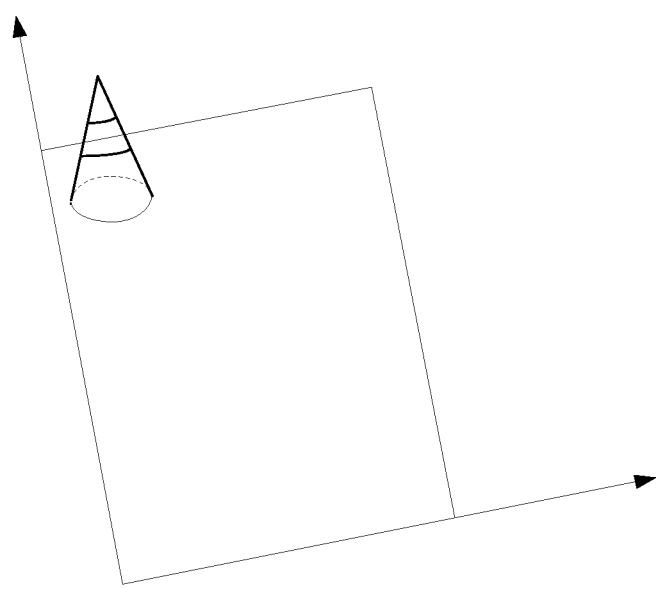
FIGS. 5a~5d are schematic diagrams showing touch effect in embodiments of the present invention.

When a finger touches the position of point P1 shown in FIG. 3 (touch effect diagram particularly shown in FIG. 5a), signals on the second wire, the first wire w1, the first wire w5, the first wire w2 and the first wire w6 electrically connected with the region electrode pad1, the self-capacitance electrode A, the self-capacitance electrode B, the self-capacitance electrode E and the self-capacitance electrode F respectively change. The larger the overlapping region area between the self-capacitance electrode and the point P1, the larger signal variation on the first wire electrically connected therewith.

The touch sensing chip determines that the touch occurs in the upper region according to the signal variation on the second wire electrically connected with the region electrode pad1, and further determines that the touch position partially overlap with the self-capacitance electrode A, the self-capacitance electrode B, the self-capacitance electrode E and the self-capacitance electrode F according to the signal variations on the first wire w1, the first wire w5, the first wire w2 and the first wire w6 electrically connected with the self-capacitance electrode A, the self-capacitance electrode B, the self-capacitance electrode E and the self-capacitance electrode F respectively and determines the specific touch position according to the amount of the signal variations on the first wire w1, the first wire w5, the first wire w2 and the first wire w6.

2. Touch Point in Lower Region Shown in FIG. 3

As shown in FIG. 3, point P2 in the lower region shown in FIG. 3 partially overlap with the region electrode pad2, the self-capacitance electrode a, the self-capacitance electrode b, the self-capacitance electrode e and the self-capacitance electrode f in the lower region. The point P2 has an overlapping region area of S5 with the self-capacitance electrode a, an overlapping region area of S6 with the self-capacitance electrode e, and an overlapping region area of S7 with the self-capacitance electrode f, wherein S5>S7>S6.

Figure 5B:
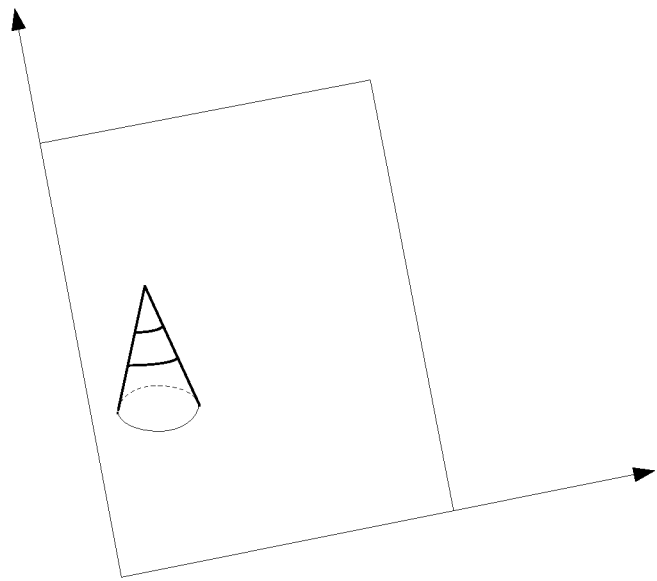

When a finger touches at the position of point P2 shown in FIG. 3 (touch effect diagram particularly shown in FIG. 5b), signals on the second wire, the first wire w1, the first wire w2 and the first wire w6 electrically connected with the region electrode pad2, the self-capacitance electrode a, the self-capacitance electrode e, and self-capacitance electrode f respectively change. The larger the overlapping region area between the self-capacitance electrode and the point P2, the larger signal variation on the first wire electrically connected therewith.

The touch sensing chip determines that the touch occurs in the lower region according to the signal variation on the second wire electrically connected with the region electrode pad2, and further determines that the touch position partially overlaps with the self-capacitance electrode a, the self-capacitance electrode e and the self-capacitance electrode f according to the signal variations on the first wire w1, the first wire w2 and the first wire w6 electrically connected with the self-capacitance electrode a, the self-capacitance electrode e and the self-capacitance electrode f respectively and determines the specific touch position according to the amount of the signal variations on the first wire w1, the first wire w2, and the first wire w6.

II. Multipoint Touch

1. Touch Points P1 and P2 as Shown in FIG. 3

Figure 5C:
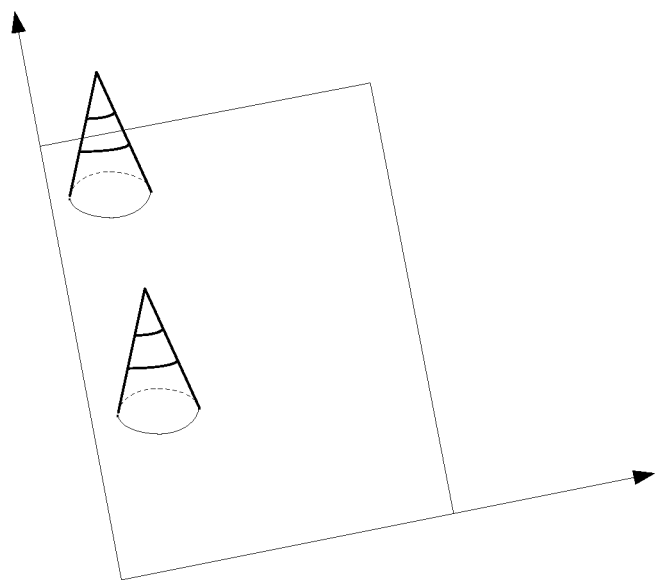

When fingers touch positions of point P1 and P2 shown in FIG. 3 at the same time, the touch effect diagram is as shown in FIG. 5c. In order to facilitate understanding the solutions of the embodiments of the present invention, it is assumed that when one position is touched, the total amount of signal variation on the first wires connected with the self-capacitance electrodes corresponding to the position is one unit amount.

When the point P1 is touched by a finger, signal on the second wire electrically connected with the region electrode pad1 changes and it is possible to determine there is a touch in the upper region. And, signals on the first wire w1, the first wire w5, the first wire w2 and the first wire w6 electrically connected with the self-capacitance electrode A, the self-capacitance electrode B, the self-capacitance electrode E and the self-capacitance electrode F respectively change. According to the principle that the larger the overlapping region area between the self-capacitance electrode and the point P1, the larger signal variation on the first wire electrically connected therewith, it is determined that the signal variation amount on the first wire w2 is 0.4, the signal variation amount on the first wire w1 is 0.3, the signal variation amount on the first wire w6 is 0.2, and the signal variation amount on the first wire w5 is 0.1.

When the point P2 is touched by a finger, signal on the second wire electrically connected with the region electrode pad2 changes and it is possible to determine there is a touch in the lower region. And signals on the first wire w1, the first wire w2 and the first wire w6 electrically connected with the self-capacitance electrode a, the self-capacitance electrode e and the self-capacitance electrode f respectively change. According to the principle that the larger the overlapping area between the self-capacitance electrode and the point P2, the larger signal variation on the first wire electrically connected therewith, it is determined that the signal variation amount on first wire w1 is 0.6, the signal variation amount on first wire w2 is 0.3, and the signal variation amount on first wire w6 is 0.1.

Since the total amount of the signal variation on the first wires is of two units and the touches occur in both the top and the lower regions, it is determined that there is one touch point in each of the top and lower regions.

According to the positional relationship (herein, adjacent relationship) of the first wire w1, the first wire w2, the first wire w5 and the first wire w6 with signal variations, the specific amount of the signal variation on each first wire with signal variation (herein, 0.9 for first wire w1, 0.7 for first wire w2, 0.1 for first wire w5, and 0.3 for first wire w6) and patterns of the self-capacitance electrodes in the top and lower regions, it is determined that the position of the touch point in the upper region partially overlaps with all of the self-capacitance electrode A, the self-capacitance electrode B, the self-capacitance electrode E and the self-capacitance electrode F, and the position of the touch point in the lower region partially overlaps with all of the self-capacitance electrode a, the self-capacitance electrode e and the self-capacitance electrode f.

2. Touch Points P1, P2 and P3 as Shown in FIG. 3

Figure 5D:
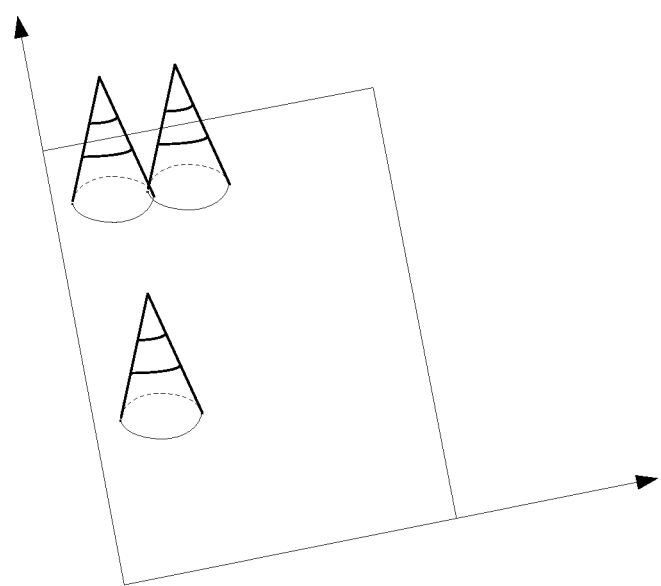

When point P1, P2 and P3 shown in FIG. 3 are touched by a finger at the same time, the touch effect diagram is as shown in FIG. 5d.

In particular, the implementation for determining positions of the points P1, P2 and P3 is similar to that of the P1 and P2 and thus not described repeatedly here.

The capacitive touch structure described in at least one embodiment of the present invention can be applied to any type of known touch panels such as add-on mode touch panels, on-cell touch panels, and in-cell touch panels.

At least one embodiment of the present invention provides an in-cell touch panel including a top substrate and a bottom substrate disposed opposite to each other and the capacitive touch structure as described in at least one embodiment of the present invention;

The self-capacitance electrodes, the region electrodes, the first wires and the second wires are disposed on a side of the top substrate facing the bottom substrate or on a side of the bottom substrate facing the top substrate.

The in-cell touch panel includes the capacitive touch structure as described in at least one embodiment of the present invention. Since the capacitive touch structure described in the embodiments of the present invention has a reduced number of wires, the number of wires in the in-cell touch panel including the capacitive touch structure provided by the embodiments of the present invention is also reduced, thus favorable to the narrow border design of the in-cell touch panel, reducing touch dead zone in the in-cell touch panel and reducing costs of the in-cell touch panel.

In at least one embodiment of the present invention, periphery traces at the border are generally disposed on the bottom substrate.

In at least one embodiment of the present invention, if the self-capacitance electrodes, the region electrodes, the first wires and the second wires are disposed on the top substrate, then the first wires and the second wires are electrically connected with the periphery traces on the bottom substrate by conductive gold balls in sealant. If the self-capacitance electrodes, the region electrodes, the first wires and the second wires are disposed on the bottom substrate, then the first wires and the second wires are directly electrically connected with the periphery traces on the bottom substrate.

In at least one embodiment of the present invention, the touch sensing chip electrically connected with the periphery traces via connection terminals are disposed on a circuit board, in particular, on a circuit board located at the back of a display device, or on a circuit board located at the border of a display device, or on a flexible circuit board contained in the bottom substrate.

The in-cell touch panel provided by at least one embodiment of the present invention further includes: a black matrix layer disposed on a side of the top substrate facing the bottom substrate or a side of the bottom substrate facing the top substrate; The orthogonal projections of the self-capacitance electrodes, the region electrodes, the first wires, and the second wires on the bottom substrate are within the orthogonal projection of the black matrix layer on the bottom substrate.

Since the orthogonal projections of the self-capacitance electrodes, the region electrodes, the first wires and the second wires on the bottom substrate are within the orthogonal projection of the black matrix layer on the bottom substrate, electric fields generated by the self-capacitance electrodes and the region electrodes will not influence electric field in pixel aperture regions and thus will not influence normal display.

Since the orthogonal projections of the self-capacitance electrodes, the region electrodes, the first wires and the second wires on the bottom substrate are within the orthogonal projection of the black matrix layer on the bottom substrate, it is also possible to avoid influence on the transmittance of touch panel.

In at least one embodiment of the present invention, the pattern of the orthogonal projections of the self-capacitance electrodes and the region electrodes on the bottom substrate is of a mesh structure within the orthogonal projection of the black matrix layer on the bottom substrate.

A density for a touch panel is generally on the order of millimeter, while a density for a display panel is generally on the order of micron, therefore one self-capacitance electrode or one region electrode can generally correspond to a plurality of pixel units in the display panel. In order to avoid the self-capacitance electrodes and the region electrodes occupy aperture regions of the pixel units, it is possible to cut out portions of the self-capacitance electrodes and the region electrodes corresponding to the aperture regions of pixel units. The density as referred to in embodiments of the present invention means the pitch between the self-capacitance electrodes of the touch panel or the pitch between the pixel units of the display panel.

Figure 7:
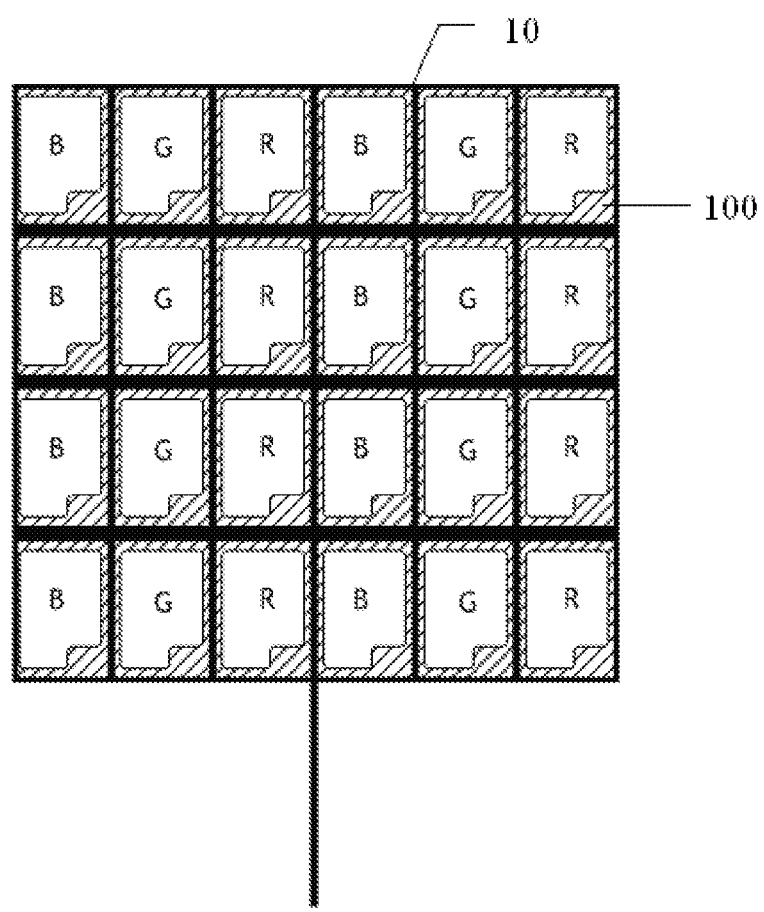
FIG. 7 is a schematic structural diagram showing a self-capacitance electrode in the capacitive touch structure provided in an embodiment of the present invention.

For example, referring to an example in which the pattern of the orthogonal projection of the self-capacitance electrodes on the bottom substrate is a mesh structure within the orthogonal projection of the black matrix layer on the bottom substrate, as shown in FIG. 7, portions of the self-capacitance electrodes 10 corresponding to the aperture regions of the pixel units are cut out. Therefore, the pattern of the self-capacitance electrodes 10 can be designed to have an mesh structure orthogonal projection on the bottom substrate within the orthogonal projection of black matrix layer 100 on the bottom substrate. Furthermore, in order to ensure display uniformity, the self-capacitance electrodes 10 are generally provided in the gaps of respective sub-pixel units in the pixel units, wherein each set of RGB sub-pixel units constitutes one pixel unit.

In at least one embodiment of the present invention, in the case that the self-capacitance electrodes, the region electrodes, the first wires and the second wires are disposed on a side of the top substrate facing the bottom substrate, it is possible to dispose the self-capacitance electrodes, the region electrodes, the first wires and the second wires at any positions on the side of the top substrate facing the bottom substrate.

For example, a black matrix layer, a color filter layer, a planarization layer and a spacer layer are sequentially stacked on the side of the top substrate facing the bottom substrate.

The self-capacitance electrodes and the region electrodes are located between the black matrix layer and color filter layer, and the first wires and the second wires are located above the color filter layer. Alternatively, the self-capacitance electrodes and the region electrodes are located between the color filter layer and planarization layer, and the first wires and the second wires are located above the planarization layer. Alternatively, the self-capacitance electrodes and the region electrodes are located between the planarization layer and the spacer layer, and the first wires and the second wires are located between the top substrate and the planarization layer.

Hereinbelow, with reference to an example in which the self-capacitance electrodes and the region electrodes are located between the black matrix layer and the color filter layer and the first wires and second wires are located above the color filter layer, implementation modes of the in-cell touch panel described in the embodiments of the present invention will be described in detail.

Figure 6A:
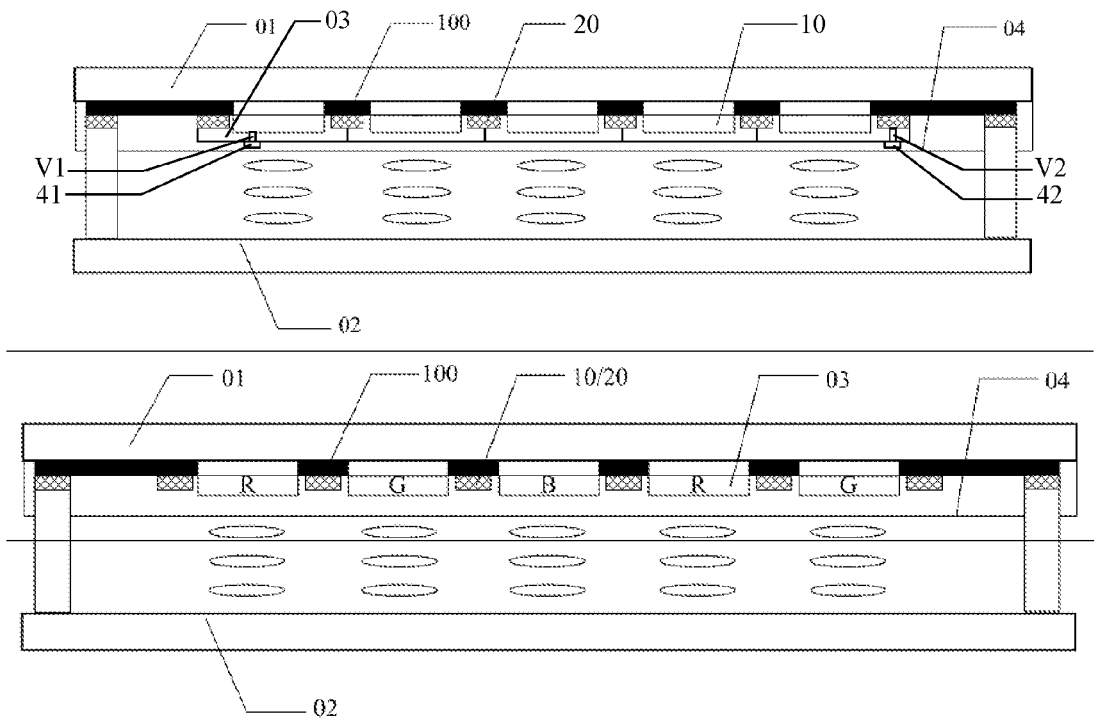
FIG. 6A is a schematic structural side view showing an in-cell touch panel of an embodiment of the present invention.

As shown in FIG. 6A, an in-cell touch panel of one embodiment of the present invention includes: a top substrate 01 and a bottom substrate 02 disposed opposite to each other; a black matrix layer 100 on a side of the top substrate 01 facing the bottom substrate 02; a layer where the self-capacitance electrodes 10 and the region electrodes 20 are located, provided on a side of the black matrix layer 100 facing the bottom substrate 02; a color filter layer 03, located on a side of the layer where the self-capacitance electrodes 10 and the region electrodes 20 are located facing the bottom substrate 02; a layer where the first wires 41 and the second wires 42 are located, provided on a side of the color filter layer 03 facing the bottom substrate 02.

A planarization layer 04 is provided on a side of the layer where the first wires 41 and second wires 42 are located facing the bottom substrate 02. The first wires are connected with respective self-capacitance electrodes 10 through via holes V1 in the color filter layer 03, and the second wires 42 are connected with respective region electrode 20 through via holes V2 in the color filter layer 03.

Disposing the layer where the self-capacitance electrodes and the region electrodes are located between the black matrix layer and the color filter layer, and disposing the layer where the first wires and the second wires are located on a side of the color filter layer facing the bottom substrate can reduce interference of signals transmitted on the first wires and the second wires caused by body capacitance.

It should to be noted that the above example in which the first wires and the self-capacitance electrodes are disposed in different layers, the second wires and the region electrodes are disposed in different layers and the first wires and second wires are disposed in the same layer is taken as an example for explaining the implementation mode of disposing the self-capacitance electrodes, the region electrodes, the first wires and the second wires on a side of the top substrate facing the bottom substrate. When the implementation mode of the layer where the self-capacitance electrodes, the region electrodes, the first wires and the second wires are located is other implementation modes, the implementation modes of disposing the self-capacitance electrodes, the region electrodes, the first wires and the second wires on a side of the top substrate facing the bottom substrate are all similar to the above-mentioned implementation mode, and thus not described repeatedly herein.

Figure 6B:
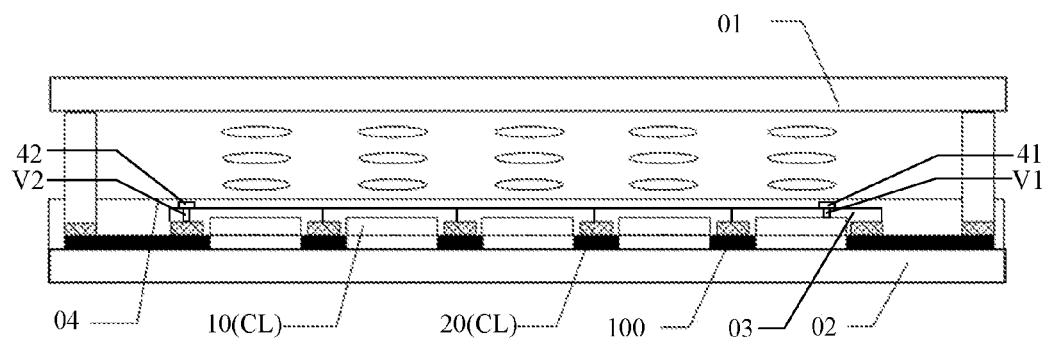
FIG. 6B is a schematic structural side view showing an in-cell touch panel of an embodiment of the present invention.

In at least one embodiment of the present invention, in the case that the self-capacitance electrodes, the region electrodes, the first wires and the second wires are disposed on a side of the bottom substrate facing the top substrate, referring to FIG. 6B, it is possible to dispose the self-capacitance electrodes 10, the region electrodes 20, the first wires 41 and the second wires 42 at any positions on the side of the bottom substrate 02 facing the top substrate 01. The specific implementation mode of disposing the self-capacitance electrodes, the region electrodes, the first wires and the second wires on the side of the bottom substrate facing the top substrate is similar to the specific implementation mode of disposing the self-capacitance electrodes, the region electrodes, the first wires and the second wires on the side of the top substrate facing the bottom substrate, and thus not described repeatedly herein.

In at least one embodiment of the present invention, in the case that the self-capacitance electrodes, the region electrodes, the first wires and the second wires are disposed on a side of the bottom substrate facing the top substrate, the self-capacitance electrodes 10 and the region electrodes 20 are used as a common electrode layer CL. Using the self-capacitance electrodes 10 and the region electrodes 20 as the common electrode layer CL can save a layer and reduce the manufacturing complexity of the in-cell touch panel in the embodiments of the present invention.

At least one embodiment of the present invention further provides a display device including the in-cell touch panel provided by at least one embodiment of the present invention. The display device can be any product or component having display function such as a cellphone, a tablet computer, a TV set, a display, a notebook computer, a digital photo frame and a navigator. The implementation modes of the display device can refer to the above-mentioned embodiments of the in-cell touch panel, and thus is not described repeatedly herein.

Since the number of wires in the in-cell touch panel provided by at least one embodiment of the present invention is reduced, the number of wires in the display device including the in-cell touch panel provided by the embodiments of the present invention is also reduced, and thus favorable to the narrow border design of the display device, reducing touch dead zone in the display device and reducing costs of the display device.

At least one embodiment of the present invention further provides a display device including an add-on mode touch panel including the capacitive touch structure provided by the embodiments of the present invention. The display device can be any product or component having display function such as a cellphone, a tablet computer, a TV set, a display, a notebook computer, a digital photo frame and a navigator. The implementation modes of the display device can refer to the above-mentioned embodiments of the in-cell touch panel, and thus is not described repeatedly herein.

Since the number of wires in the capacitive touch structure provided by at least one embodiment of the present invention is reduced, the number of wires in the add-on mode touch panel including the capacitive touch structure provided by the embodiments of the present invention and the number of wires in the display device including the add-on mode touch panel are also reduced, thus favorable to the narrow border design of the display device, reducing touch dead zone in the display device and reducing costs of the display device.

At least one embodiment of the present invention further provides a scanning method for the display device, comprising: conducting touch scanning and display scanning in a time-division manner during one frame period.

During the touch scanning, the touch sensing chip applies driving signals to the region electrodes in a time-division manner through the second wires and the periphery traces connected with the region electrodes. And during applying driving signals to each region electrode, the touch sensing chip applies driving signals to respective self-capacitance electrodes in a time-division manner through the first wires and the periphery traces connected with the self-capacitance electrodes; receiving feedback signals of the self-capacitance electrodes and the region electrodes, and determining regions where a touch position locates according to the feedback signals of the region electrodes, and determining the touch position according to feedback signals of the self-capacitance electrodes.

Conducting touch scanning and display scanning in a time-division manner can reduce mutual interference between the display signals and the touch signals, thus enhancing picture quality and touch accuracy. And in particular implementation, a display driving chip and a touch sensing chip can be integrated as one chip so as to reduce the production costs.

The scanning method for the display device in the embodiment of the present invention will be described in detail below with reference to FIG. 8a.

Figure 8A:
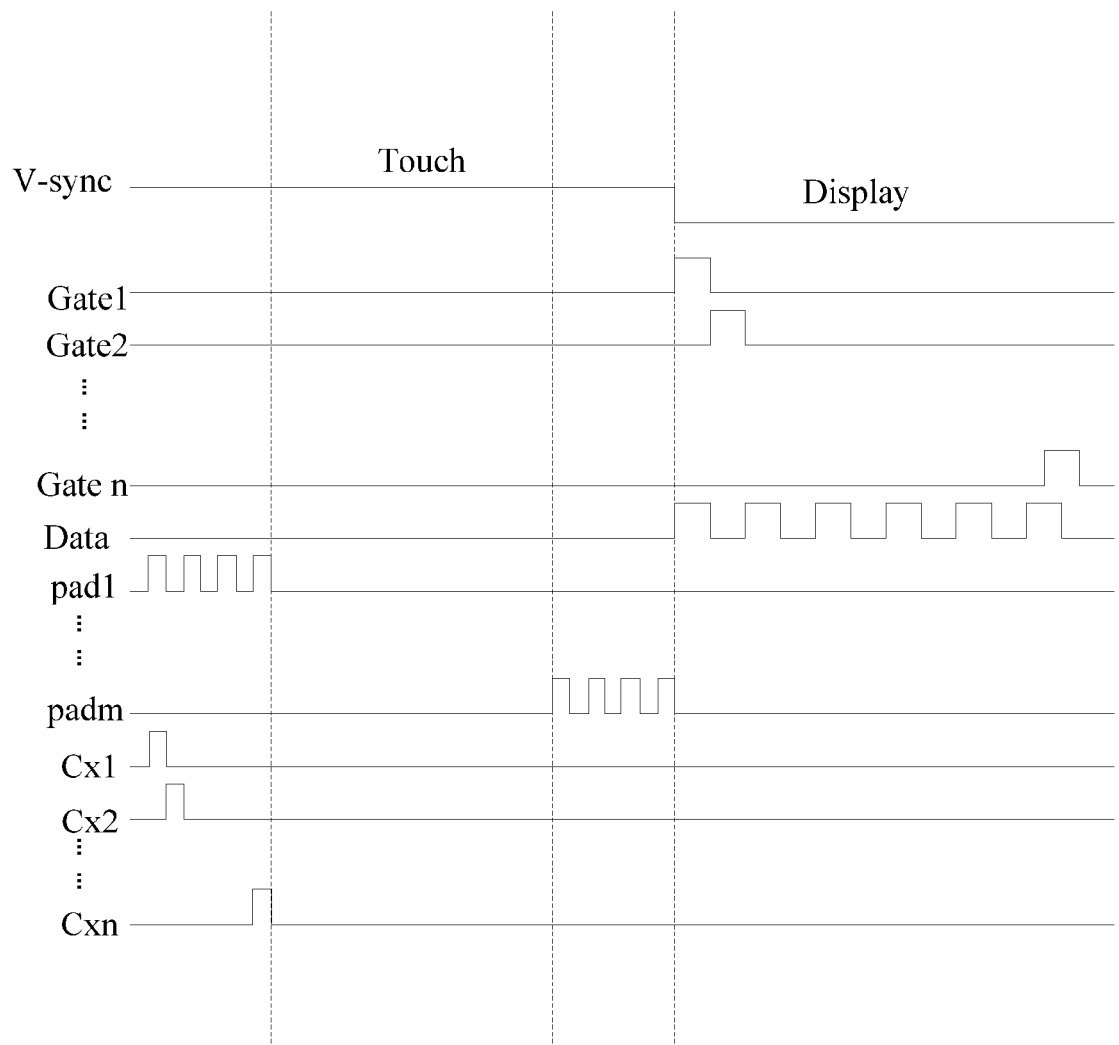
FIGS. 8a~8c are driving time sequence diagrams of a display device in an embodiment of the present invention.

As shown in FIG. 8a, the period for the display device to display each frame (V-sync) is divided into a display scanning period (Display) and a touch scanning period (Touch). For example, the period for the display device to display one frame is 16.7 milliseconds (ms), wherein 5 ms is selected as the touch scanning period, and the other 11.7 ms is selected as the display scanning period. Of course, it is possible to appropriately adjust the duration of the touch scanning period and the display scanning period according to the processing capacity of IC chips, which is not particularly limited here.

During the display scanning period (Display), gate signal lines Gate 1, Gate 2, . . . Gate n in the display device are applied with gate scanning signals successively and data signal line Data is applied with a gray scale signal, so as to implement display function.

During the touch scanning period (Touch), the touch sensing chip applies driving signals to respective region electrodes pad1 . . . padm in a time-division manner. And during applying driving signals to respective region electrodes, the touch sensing chip applies driving signals to respective self-capacitance electrodes Cx1 . . . Cxn in a time-division manner. At the same time, the touch sensing chip receives feedback signals from the respective self-capacitance electrodes Cx1 . . . Cxn and the respective region electrodes pad1 . . . padm. The touch sensing chip determines regions in which touch positions are located by analyzing the feedback signals of the respective region electrodes pad1 . . . padm, and determines the touch positions by analyzing the feedback signals of the respective self-capacitance electrodes Cx1 . . . Cxn, thereby implementing touch function.

For example, in the case that the self-capacitance electrodes and the region electrodes are disposed on the side of the bottom substrate facing the top substrate and the self-capacitance electrodes and the region electrodes are used as a common electrode layer, a Vcom voltage is applied to the respective self-capacitance electrodes and the respective region electrodes during the display scanning period (Display). Therefore, the display device displays normally.

For example, in the case that the self-capacitance electrodes and region electrodes are disposed on the side of the bottom substrate facing the top substrate, a floating voltage is applied to the respective self-capacitance electrodes and the respective region electrodes during the display scanning period (Display).

It is possible to avoid forming an over against electric field between the self-capacitance electrodes and the region electrodes on the top substrate and electrodes on the bottom substrate, so as to avoid negative impact on the display of display device to a certain extent.

For example, during the touch scanning period (Touch), the touch sensing chip can also apply driving signals to respective region electrodes simultaneously and apply driving signals to respective self-capacitance electrodes in a time-division manner.

Figure 8B:
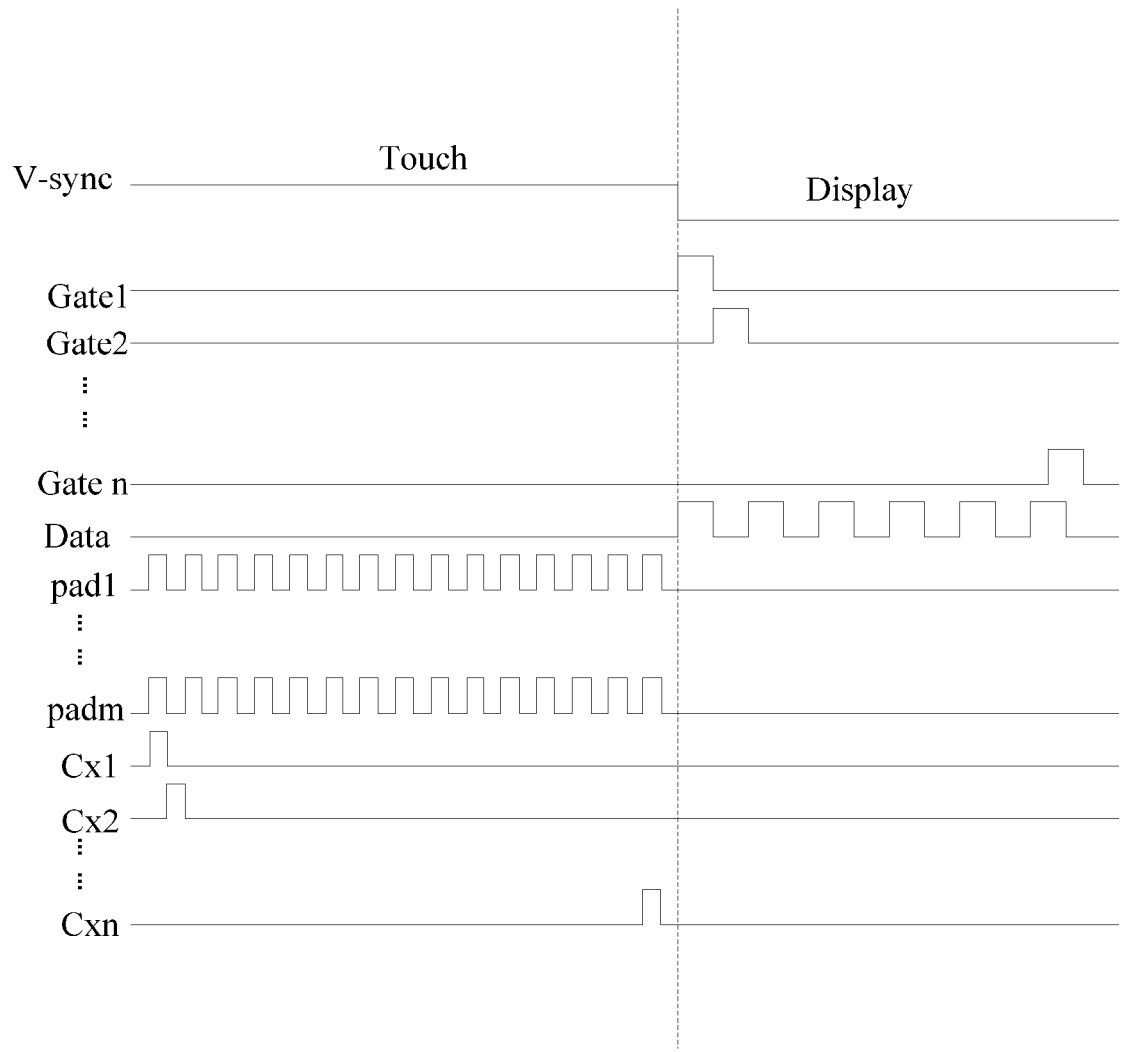

For example, as shown in FIG. 8b, during the touch scanning period (Touch), the touch sensing chip applies driving signals to respective region electrodes pad1 . . . padm simultaneously and applies driving signals to respective self-capacitance electrodes Cx1 . . . Cxn in a time-division manner; and at the same time, the touch sensing chip receives feedback signals of self-capacitance electrodes Cx1 . . . Cxn and region electrodes pad1 . . . padm, and determines touch positions by analyzing the feedback signals, thereby implementing touch function.

For example, during the touch scanning period (Touch), the touch sensing chip can also apply driving signals to respective region electrodes and respective self-capacitance electrodes in a time-division manner.

Figure 8C:
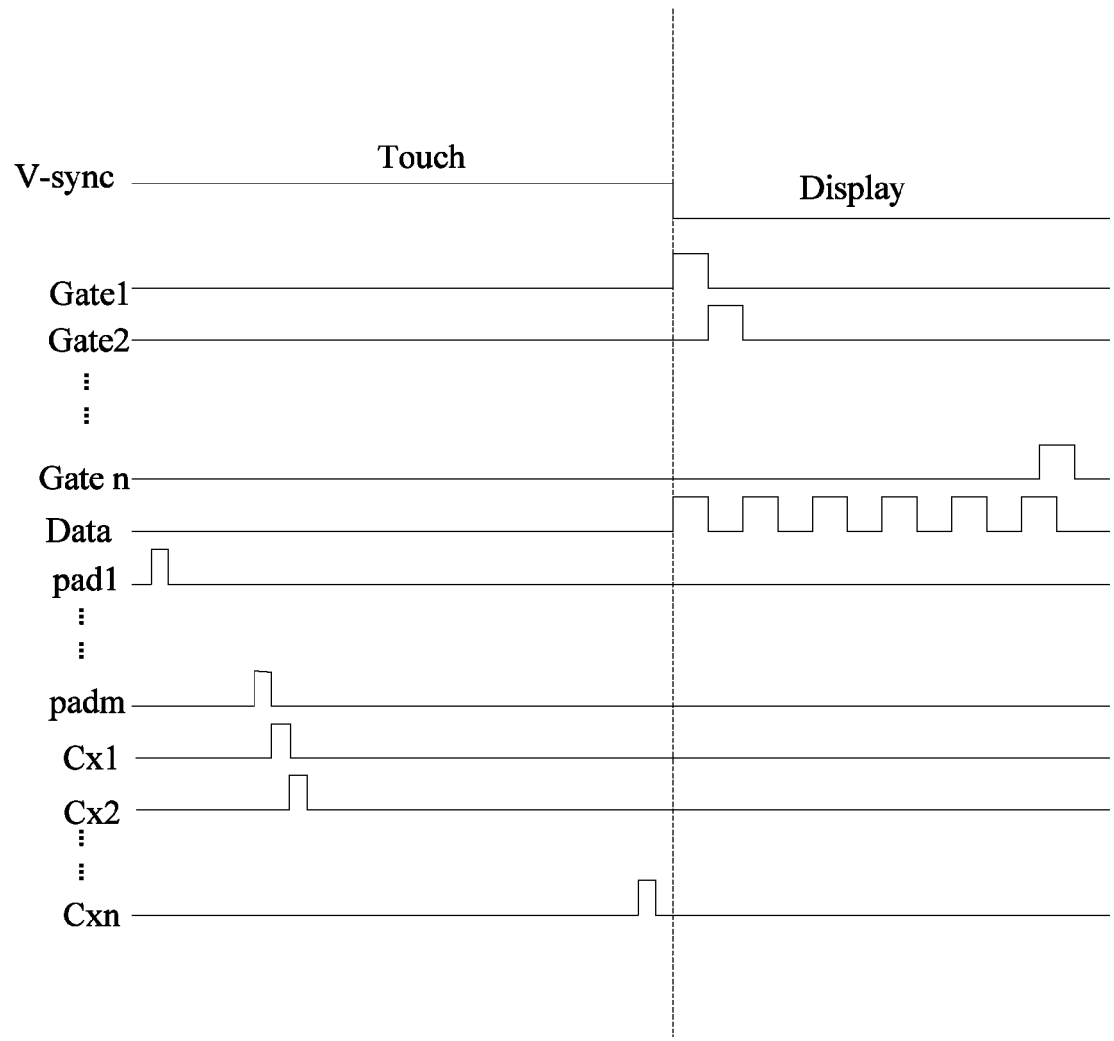

For example, for example, as shown in FIG. 8c, during the touch scanning period (Touch), the touch sensing chip applies driving signals to respective region electrodes pad1 . . . padm and respective self-capacitance electrodes Cx1 . . . Cxn in a time-division manner; and at the same time, the touch sensing chip receives feedback signals of the respective self-capacitance electrodes Cx1 . . . Cxn and the respective region electrodes pad1 . . . padm, and determines touch positions by analyzing the feedback signals, thereby implementing touch function.

For example, in the case that the driving signals are applied to respective self-capacitance electrodes in a time-division manner, the touch sensing chip can scan the self-capacitance electrodes one by one in a transverse direction so as to apply the driving signals to respective self-capacitance electrodes in a time-division manner; and the touch sensing chip can also the scan self-capacitance electrodes one by one in a vertical direction so as to apply the driving signals to respective self-capacitance electrodes.

What are described above is related to the illustrative embodiments of the disclosure only and not limitative to the scope of the disclosure; the scopes of the disclosure are defined by the accompanying claims.

The present application claims priority of China Patent application No. 201410241053.2 filed on May 30, 2014, the content of which is incorporated in its entirety as part of the present application by reference herein.

What is claimed is:

1. A capacitive touch structure comprising:
a plurality of self-capacitance electrodes arranged in a matrix in a same layer and insulated from each other, located in at least two regions contained in a layer surface where the self-capacitance electrodes are located;
region electrodes in the respective regions, disposed in the same layer with the self-capacitance electrodes and insulated from the self-capacitance electrodes;
a plurality of first wires electrically connected with the self-capacitance electrodes but not crossing each other, wherein there are at least a plurality of the first wires that satisfy the following conditions: one of the first wires is electrically connected with at least two of the self-capacitance electrodes, and the at least two self-capacitance electrodes are located in different regions respectively;
a plurality of second wires electrically connected with the region electrodes but not crossing each other, wherein the region electrodes in respective regions are electrically connected with different second wires; and
a touch sensing chip electrically connected with the first wires and the second wires and configured to determine a touch position,
wherein the first wires and the self-capacitance electrodes are disposed in different layers, and the second wires and the region electrodes are disposed in different layers;
the first wires and the second wires are disposed in a same layer without crossing each other.

2. The capacitive touch structure of claim 1, wherein the self-capacitance electrodes are respectively located in at least two regions contained in the layer surface where the self-capacitance electrodes are located and divided along horizontal direction, the at least two self-capacitance electrodes electrically connected with the one of the first wires are located in a same column;
or,
the self-capacitance electrodes are respectively located in at least two regions contained in the layer surface where the self-capacitance electrodes are located and divided along the vertical direction, the at least two self-capacitance electrodes electrically connected with the one of the first wires are located in a same row.

3. The capacitive touch structure of claim 2, wherein the region electrode in each of the regions includes a plurality of branches in a gap region between adjacent rows and/or columns of the self-capacitance electrodes.

4. The capacitive touch structure of claim 2, wherein opposite sides of adjacent two of the self-capacitance electrodes are both fold lines.

5. The capacitive touch structure of claim 1, wherein the region electrode in each of the regions includes a plurality of branches in a gap region between adjacent rows and/or columns of the self-capacitance electrodes.

6. The capacitive touch structure of claim 5, wherein the first wires and the self-capacitance electrodes are disposed in different layers, and the second wires and the region electrodes are disposed in different layers;
the first wires and the second wires are disposed in a same layer without crossing each other.

7. The capacitive touch structure of claim 5, wherein opposite sides of adjacent two of the self-capacitance electrodes are both fold lines.

8. The capacitive touch structure of claim 1, wherein opposite sides of adjacent two of the self-capacitance electrodes are both fold lines.

9. The capacitive touch structure of claim 8, wherein the opposite sides of the adjacent two self-capacitance electrodes that are fold lines both have step-like structures which are consistent and matching each other in shape; and/or
the opposite sides of the adjacent two self-capacitance electrodes that are fold lines both have concave-convex structures which are consistent and matching each other in shape.

10. The capacitive touch structure of claim 1, wherein the first wires connecting with the self-capacitance electrodes extend to a border of the touch panel; and the second wires connecting with the region electrodes extend to a border of the touch panel;
the touch panel further comprises periphery traces electrically connected with the first wires and the second wires at the border of the touch panel; and
the touch sensing chip is electrically connected with the periphery traces via connection terminals.

11. The capacitive touch structure of claim 10, wherein the self-capacitance electrodes are located in at least two regions contained in the layer surface where the self-capacitance electrodes are located and divided along a horizontal direction respectively, the at least two self-capacitance electrodes electrically connected with the one of the first wires are located in the same column; and the touch panel has a rectangle border, and extension directions of the first wires and second wires are consistent with a direction of a short side of the border.

12. The capacitive touch structure of claim 10, wherein the self-capacitance electrodes are located in at least two regions contained in the layer surface where the self-capacitance electrodes are located and divided along a vertical direction respectively, the at least two self-capacitance electrodes electrically connected with the one of the first wires are located in the same row; and the touch panel has a rectangle border, and extension directions of the first wires and the second wires are consistent with a direction of a long side of the border.

13. An in-cell touch panel comprising a top substrate and a bottom substrate oppositely disposed and a capacitive touch structure; wherein, the capacitive touch structure comprising:

a plurality of self-capacitance electrodes arranged in a matrix in a same layer and insulated from each other, located in at least two regions contained in a layer surface where the self-capacitance electrodes are located;

region electrodes in the respective regions, disposed in the same layer with the self-capacitance electrodes and insulated from the self-capacitance electrodes;

a plurality of first wires electrically connected with the self-capacitance electrodes but not crossing each other, wherein there are at least a plurality of the first wires that satisfy the following conditions: one of the first wires is electrically connected with at least two of the self-capacitance electrodes, and the at least two self-capacitance electrodes are located in different regions respectively;

a plurality of second wires electrically connected with the region electrodes but not crossing each other, wherein the region electrodes in respective regions are electrically connected with different second wires; and a touch sensing chip electrically connected with the first wires and the second wires and configured to determine a touch position, wherein, the self-capacitance electrodes, the region electrodes, the first wires and the second wires are disposed on a side of the bottom substrate facing the top substrate; and the self-capacitance electrodes and the region electrodes are used as a common electrode layer.

14. The in-cell touch panel of claim 13, further comprising: a black matrix layer disposed on the side of the top substrate facing the bottom substrate or on the side of the bottom substrate facing the top substrate;

wherein orthogonal projections of the self-capacitance electrodes, the region electrodes, the first wires and the second wires on the bottom substrate are within an orthogonal projection of the black matrix layer on the bottom substrate.

15. The in-cell touch panel of claim 14, wherein the orthogonal projection of said the respective self-capacitance electrodes and the region electrodes on the bottom substrate has a pattern of mesh structure and locates within the orthogonal projection of the black matrix layer on the bottom substrate.

16. The in-cell touch panel of claim 14, wherein the black matrix layer is located on the side of the top substrate facing the bottom substrate and the color filter layer is further disposed on the black matrix layer;

the self-capacitance electrodes and the region electrodes disposed in the same layer are located between the black matrix layer and the color filter layer; the first wires and the second wires disposed in a same layer are located above the color filter layer, the first wires are electrically connected with corresponding self-capacitance electrodes through via holes in the color filter layer, and the second wires are electrically connected with corresponding region electrodes through via holes in the color filter layer.

17. A display device comprising the in-cell touch panel of claim 13.

18. A capacitive touch structure comprising:

a plurality of self-capacitance electrodes arranged in a matrix in a same layer and insulated from each other, located in at least two regions contained in a layer surface where the self-capacitance electrodes are located;

region electrodes in the respective regions, disposed in the same layer with the self-capacitance electrodes and insulated from the self-capacitance electrodes;

a plurality of first wires electrically connected with the self-capacitance electrodes but not crossing each other, wherein there are at least a plurality of the first wires that satisfy the following conditions: one of the first wires is electrically connected with at least two of the self-capacitance electrodes, and the at least two self-capacitance electrodes are located in different regions respectively;

a plurality of second wires electrically connected with the region electrodes but not crossing each other, wherein the region electrodes in respective regions are electrically connected with different second wires; and a touch sensing chip electrically connected with the first wires and the second wires and configured to determine a touch position, wherein, each of the region electrodes defines at least one closed region in one of the regions, and at least one of the self-capacitance electrodes is located within the at least one closed region.

* * * * *